United States Patent
Uchimura et al.

(10) Patent No.: US 11,188,871 B2
(45) Date of Patent: Nov. 30, 2021

(54) WIRELESS TAG SYSTEM, PRODUCT MANAGEMENT DEVICE, AND PRODUCT MANAGEMENT METHOD

(71) Applicant: NEC Corporation, Tokyo (JP)

(72) Inventors: Jun Uchimura, Tokyo (JP); Hiroshi Takahashi, Kanagawa (KP); Masato Watanabe, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/963,977

(22) PCT Filed: Jan. 17, 2019

(86) PCT No.: PCT/JP2019/001254
§ 371 (c)(1),
(2) Date: Jul. 22, 2020

(87) PCT Pub. No.: WO2019/146489
PCT Pub. Date: Aug. 1, 2019

(65) Prior Publication Data
US 2021/0042688 A1 Feb. 11, 2021

(30) Foreign Application Priority Data
Jan. 25, 2018 (JP) .............................. JP2018-010968

(51) Int. Cl.
*G06Q 10/08* (2012.01)
*G06K 7/10* (2006.01)
(Continued)

(52) U.S. Cl.
CPC ....... *G06Q 10/087* (2013.01); *G06K 7/10316* (2013.01); *G06K 19/0723* (2013.01); *G06Q 30/0185* (2013.01)

(58) Field of Classification Search
CPC .. G06Q 10/087; G06Q 10/875; G06Q 30/185; G06K 7/316; G06K 19/0723
(Continued)

(56) References Cited

U.S. PATENT DOCUMENTS

2007/0069022 A1* 3/2007 Hatakeyama ...... G06K 7/10178
235/451
2010/0237995 A1* 9/2010 Iwahashi ............ G06K 7/10346
340/10.1
(Continued)

FOREIGN PATENT DOCUMENTS

JP H07-093491 A 4/1995
JP 2009-152736 A 7/2009
(Continued)

OTHER PUBLICATIONS

International Search Report for PCT Application No. PCT/JP2019/001254, dated Mar. 5, 2019.
(Continued)

*Primary Examiner* — Edwyn Labaze
(74) *Attorney, Agent, or Firm* — Sughrue Mion, PLLC

(57) ABSTRACT

A wireless tag system includes: a tag signal antenna configured to receive a tag signal transmitted from a wireless transmission tag; and a communication area shaping antenna configured to transmit a reception area shaping signal for narrowing an area in which the tag signal antenna can communicate with the wireless transmission tag, wherein the tag signal antenna and the communication area shaping antenna are arranged for each prescribed product unit in a group of products that are arranged.

8 Claims, 8 Drawing Sheets

(51) Int. Cl.
*G06K 19/07* (2006.01)
*G06Q 30/00* (2012.01)

(58) Field of Classification Search
USPC .......................... 235/385, 375, 487; 705/28
See application file for complete search history.

(56) References Cited

U.S. PATENT DOCUMENTS

2013/0169417 A1\* 7/2013 Sugano ................ G06K 7/01
                                                               340/10.1
2014/0103113 A1 4/2014 Washiro

FOREIGN PATENT DOCUMENTS

| JP | 2012-221100 A | 11/2012 |
| JP | 2014-080276 A | 5/2014 |
| JP | 2016-131012 A | 7/2016 |
| JP | 2016-172605 A | 9/2016 |

OTHER PUBLICATIONS

Japanese Office Action far JP Application No. 2018-010968 dated Aug. 10, 2021 with English Translation.

\* cited by examiner

WIRELESS TAG SYSTEM, PRODUCT MANAGEMENT DEVICE, AND PRODUCT MANAGEMENT METHOD

This application is a National Stage Entry of PCT/JP2019/001254 filed on Jan. 17, 2019, which claims priority from Japanese Patent Application 2018-010968 filed on Jan. 25, 2018, the contents of all of which are incorporated herein by reference, in their entirety.

TECHNICAL FIELD

The present invention relates to a wireless tag system, a product management device, and a product management method.

BACKGROUND ART

An RFID (Radio Frequency Identifier) tag is attached to each product placed on a product shelf, with product management then being performed by reading signals from the RFID tags. As related technology, a management device and a management method that can identify the locations of objects are disclosed in Patent Document 1.

CITATION LIST

Patent Literature

[Patent Document 1]
Japanese Unexamined Patent Application, First Publication No. 2014-80276

SUMMARY OF INVENTION

Problem to be Solved by the Invention

In the product management as described above, the reading device that reads signals transmitted from RFID tags is required to be able to receive the signal from the RFID tag attached to a desired product among a plurality of different products displayed adjacent to each other.

Thus, an objective of the present invention is to provide a wireless tag system, a product management device, and a product management method that can solve the above-mentioned problem.

Means for Solving the Problem

According to a first embodiment of the present invention, a wireless tag system includes: a tag signal antenna configured to receive a tag signal transmitted from a wireless transmission tag; and a communication area shaping antenna configured to transmit a reception area shaping signal for narrowing an area in which the tag signal antenna can communicate with the wireless transmission tag, wherein the tag signal antenna and the communication area shaping antenna are arranged for each prescribed product unit in a group of products that are arranged.

According to a second embodiment of the present invention, a product management device is characterized by being provided in a wireless tag system in which a tag signal antenna configured to receive a tag signal transmitted by a wireless transmission tag, and a communication area shaping antenna that transmits a reception area shaping signal for narrowing an area in which the tag signal antenna can communicate with the wireless transmission tag are arranged for each prescribed product unit in a group of products that are arranged, wherein: the product management device identifies an arrangement location of the product based on an identifier of the tag signal antenna that received the tag signal identifying the product.

According to a third embodiment of the present invention, a product management method is characterized by arranging, for each prescribed product unit in a group of products that are arranged, a tag signal antenna configured to receive a tag signal transmitted by a wireless transmission tag, and a communication area shaping antenna configured to transmit a reception area shaping signal for narrowing an area in which the tag signal antenna can communicate with the wireless transmission tag.

Advantageous Effects of Invention

According to the present invention, the location of a product can be estimated on the basis of a tag signal received by a tag signal antenna, and the number and locations of desired products can be managed.

DESCRIPTION OF EMBODIMENTS

Hereinafter, a wireless tag system, a product management device, and a product management method according to an embodiment of the present invention will be explained with reference to the drawings.

Figure 1:
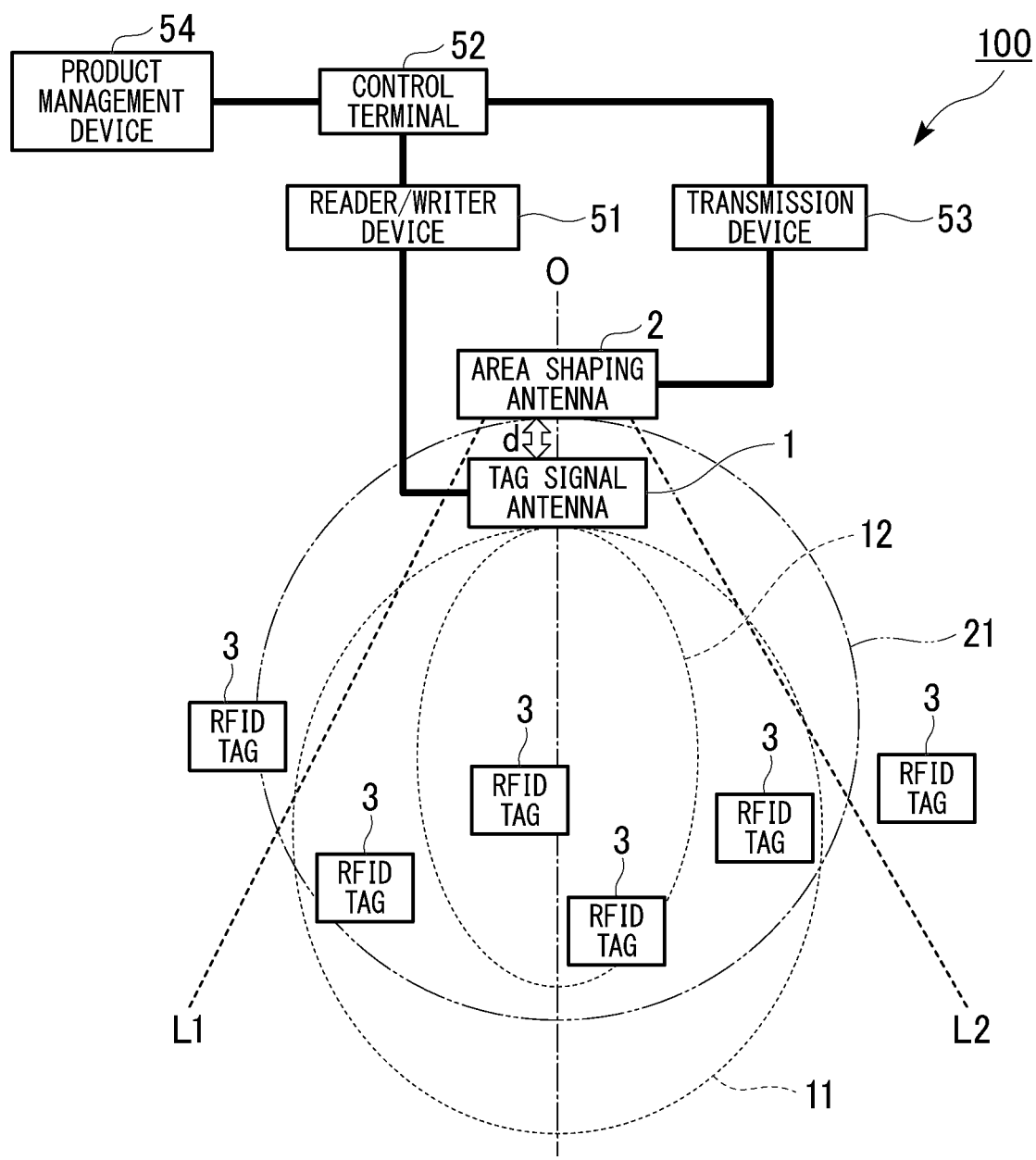
FIG. 1 is a first diagram illustrating the structure of a wireless tag system according to an embodiment of the present invention.

FIG. 1 is a first diagram illustrating the structure of a wireless tag system according to the same embodiment.

As illustrated in this diagram, the wireless tag system 100 is provided with a tag signal antenna 1, an area shaping antenna 2 (communication area shaping antenna), a reader/writer device 51, a control terminal 52, a transmission device 53 and a product management device 54.

The reader/writer device 51 reads information written into RFID tags 3, which are an embodiment of a wireless transmission tag, and writes information into the RFID tags 3. The tag signal antenna 1 is an RFID antenna that, based on control by the reader/writer device 51, transmits, to the RFID tags 3, a trigger signal that triggers startup of the RFID tags 3.

The RFID tag 3 that has received the trigger signal, in one example, is activated by converting a magnetic field generated in a coil within the tag into an electrical signal on the basis of the trigger signal, and performs signal transmission/reception with the tag signal antenna 1. When the trigger signal indicates a write instruction, the RFID tag 3 writes information included in the signal into a storage unit. When the trigger signal indicates a reading instruction, the RFID tag 3 transmits a tag signal including stored information. The reader/writer device 51 receives tag signals via the tag signal antenna 1 and reads information included in the signals. Further, the wireless tag system 100 is provided with a control terminal 52 for controlling the reader/writer device 51 and the transmission device 53.

In the RFID system constituted by the reader/writer device 51, the tag signal antenna 1, and the RFID tag 3, wireless communication is mutually performed using a wireless signal (trigger signal, tag signal) having a frequency in the 920 MHz band, for example. The RFID system uses, for example, the mirror subcarrier type RFID modulation method. In the RFID system, for example, radio signals in the same frequency band are used.

In the present embodiment, an RFID system is utilized. For this reason, the example that is indicated is the case in which the RFID tags 3 start up and transmit a tag signal only when a trigger signal is received. However, the RFID system may be a system in which active tags are provided instead of the RFID tags 3, and the active tags transmit tag signals. In this case, the area shaping antenna 2 may form a shaping area 12 by lowering the reception sensitivity of the tag signal antenna 1.

The wireless tag system 100 is also provided with a transmission device 53 that controls transmission of signals from the area shaping antenna 2. The area shaping antenna 2 is disposed on a side opposite to the RFID tag 3 with respect to the tag signal antenna 1. That is, the area shaping antenna 2 is located in a direction opposite to the direction in which the tag signal antenna 1 faces the RFID tag 3. In other words, with respect to the RFID tag 3, the area shaping antenna 2 is located to the rear of the tag signal antenna 1.

The area shaping antenna 2 transmits reception area shaping signals based on control by the transmission device 53. The reception area shaping signals are signals that narrow the area in which RFID tags 3 that are tag signal transmission sources capable of robustly exchanging tag signals with the tag signal antenna 1 are located.

The area shaping antenna 2 transmits, for example, a wireless signal in the same frequency band as the tag signal antenna 1. For example, the area shaping antenna 2 transmits a 920 MHz band wireless signal. In this case, the transmission device 53 performs wireless communication specified by IEEE 802.15.4g, which causes the area shaping antenna 2 to transmit a 920 MHz band wireless signal.

In the present embodiment, the reception area shaping signals transmitted by the area shaping antenna 2 are noise signals. This causes a reduction in the tag signal reception sensitivity in the tag signal antenna 1, and a reduction in the trigger signal reception sensitivity in the RFID tag 3. By causing a reduction in the reception accuracy such as these reception sensitivities, the communication area shaping antenna 2 limits the area in which is included the RFID tag 3 that is the source of the tag signal that can be accurately received by the tag signal antenna 1.

That is, the area shaping antenna 2 outputs, from behind the tag signal antenna 1, a noise signal for signals transmitted and received between the tag signal antenna 1 and the RFID tag 3. Thereby, the arrangement area of the RFID tags 3 capable of satisfactorily transmitting and receiving signals to/from the tag signal antenna 1 is limited on the basis of the carrier-to-noise ratio (C/N ratio).

The trigger signal transmitted by the tag signal antenna 1 is transmitted with an output giving rise to an electric field strength at which reception becomes favorable for the RFID tag 3 in a trigger signal reception area 11 (first reception area).

The reception area shaping signals transmitted by the area shaping antenna 2 are transmitted with an output giving rise to an electric field strength that affects the reception accuracy of the RFID tag 3 or the tag signal antenna 1 in a shaping signal reception area 21. The area shaping antenna 2 transmits reception area shaping signals so that at least the axis of the beam of the trigger signal overlaps the shaping signal reception area 21.

Due to the area shaping antenna 2 transmitting the reception area shaping signals, the range of the trigger signal reception area 11 including the RFID tag 3, which is the transmission source of the tag signal receivable by the tag signal antenna 1, narrows to the shaping area 12 shown in FIG. 1. That is, by the output of the reception area shaping signals as noise signals, the range of the trigger signal reception area 11 is limited to the range of the shaping area 12.

This enables the tag signal antenna 1 to transmit and receive signals to and from the RFID tags 3 located within the shaping area 12, whose area is narrowed as shown in FIG. 1. Thereby it is difficult for the tag signal antenna 1 to transmit and receive signals to and from the RFID tags 3 located outside the shaping area 12. In other words, even if located within the trigger signal reception area 11, it is difficult for the RFID tags 3 located outside the shaping area 12 to transmit and receive signals to and from the tag signal antenna 1 satisfactorily.

More specifically, the reception area shaping signals transmitted by the area shaping antenna 2 become noise signals, reach the RFID tag 3, and reach the tag signal antenna 1. Since the reception area shaping signals are blocked by the tag signal antenna 1, for those RFID tags 3 located in the area not reached by the direct waves of the reception area shaping signals, the effect of a decrease in the reception sensitivity due to the reception area shaping signals is reduced. In other words, for the RFID tags 3 located in the area where the influence of the reception area shaping signals is small, the degree of decrease in the reception sensitivity due to the noise signal is reduced.

However, for the tag signal antenna 1, the reception area shaping signals become a noise signal, and the reception sensitivity thereof is reduced. For this reason, the reception accuracy thereof to the tag signals transmitted by the RFID tags 3 at a far position in the trigger signal reception area 11 is deteriorated. That is, since the tag signal antenna 1 is affected by the reception area shaping signals, the reception sensitivity thereof to tag signals from distant RFID tags 3 is reduced.

For the RFID tags 3 located in the direct wave interference area reached by the direct waves of the reception area shaping signals, the direct waves of the reception area shaping signals become a noise signal. As a result, the RFID tags 3 located in the direct wave interference area cannot receive the signal from the tag signal antenna 1 satisfactorily, and so the possibility of transmitting the tag signal is reduced.

Thereby, the wireless tag system 100 can narrow the area including the RFID tags 3 that are the source of the tag signals receivable by the tag signal antenna 1 in the manner of the shaping area 12.

That is, in the field where the RFID tags 3 are arranged, the reception sensitivity of the RFID tags 3 increases in the shaping area 12, while the reception sensitivity decreases outside the shaping area 12.

In FIG. 1, signals transmitted from the tag signal antenna 1 and the area shaping antenna 2 have a central axis O. The central axis O is, for example, the central axis of the directivity of the tag signal antenna 1 and the area shaping antenna 2. The transmission directivity and the reception directivity of each antenna may be the same or different.

A side different from the central axis O across the broken line L1 and a side different from the central axis O across the broken line L2 in FIG. 1 are for convenience of description referred to as direct wave interference areas which are reached by direct waves of the reception area shaping signals. That is, the region to the outside of the broken line L1 with respect to the central axis O and the region to the outside of the broken line L2 with respect to the central axis O are referred to as direct wave interference regions, respectively.

In FIG. 1, the region on the central axis O side across the broken line L1 and the region on the central axis O side across the broken line L2 are diffracted wave interference regions reached by diffracted waves of the reception area shaping signals. That is, the region inside the broken line L1 with respect to the central axis O and the region inside the broken line L2 with respect to the central axis O are each referred to as a diffracted wave interference region. In the diffracted wave interference region, the reception area shaping signals become a noise signal, whereby the reception accuracy of the tag signal antenna 1 and the reception accuracy of the RFID tags 3 are reduced. Thereby, the shaping area 12 is shaped into a narrow area that is to the tag signal antenna 1 and closer to the center axis O with respect to the outer edge of the trigger signal reception area 11. In other words, the shaping area 12 is an area limited to an area where the effect due to the reception area shaping signals is small, within the trigger signal reception area 11.

The area shaping antenna 2 according to the present embodiment may be configured and arranged so as to cause a reduction in the reception accuracy of at least one of a reduction in the reception accuracy of the trigger signal of the RFID tag 3 on the basis of the reception area shaping signals becoming noise signals and a reduction in the reception accuracy in the tag signal antenna 1 of the tag signal on the basis of the reception area shaping signals becoming noise signals. The area shaping antenna 2 is configured and arranged so as to bring about any reduction in reception accuracy in this way. Doing so limits the area in which is positioned the RFID tags 3, the transmission sources of the tag signals, that can transmit and receive signals with the tag signal antenna 1 satisfactorily. That is, arranging the area shaping antenna 2 behind the tag signal antenna 1 can limit the area in which is positioned the RFID tags 3 that can satisfactorily transmit and receive signals to and from the tag signal antenna 1.

Additionally, the product management device 54 in the wireless tag system 100 is communicably connected to the control terminal 52. The product management device 54 performs management processes such as identifying the arrangement locations of products based on an identifier of the tag signal antenna 1 that received the tag signals.

Figure 2:
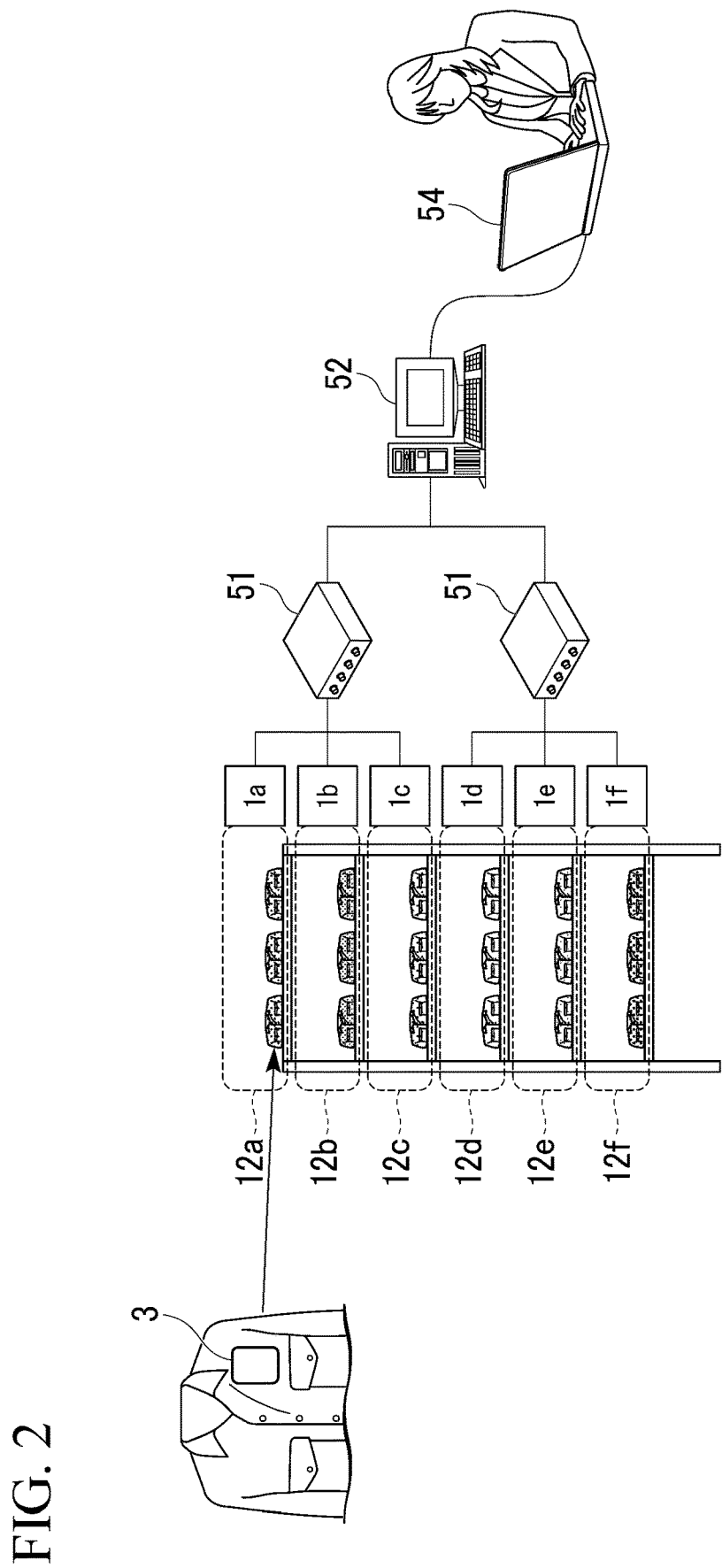
FIG. 2 is a first diagram illustrating a specific example of a wireless tag system according to an embodiment of the present invention.

FIG. 2 is a first diagram illustrating a specific example of a wireless tag system according to the same embodiment.

In FIG. 2, the products are arrayed on product shelves in separate product units. The product units may be product types. Alternatively, the product units may be shelf arrangement ranges. RFID tags 3 are attached to the products.

Furthermore, tag signal antennas 1 are arranged at locations at which signals can be received from each product unit. In FIG. 2, a tag signal antenna 1 is arranged at the height of each shelf. The tag signal antennas will be referred to as the tag signal antennas 1$a$, 1$b$, . . . , 1$f$ in the order from the tag signal antenna 1 that is arranged on the uppermost shelf towards the lower shelves.

Though not illustrated in FIG. 2, an area shaping antenna 2 is arranged at a location on a side of the tag signal antennas 1 (1$a$, 1$b$, . . . , 1$f$) opposite to the products. The shelves are referred to as the first row, the second row, . . . from the uppermost shelf downward. In this case, the product management device 54 can detect that a tag signal received by the tag signal antenna 1$a$ is a tag signal received from an RFID tag 3 of a product arranged on the first row. Similarly, the product management device 54 can detect that a tag signal received by the tag signal antenna 1$b$ is a tag signal received from an RFID tag 3 of a product arranged on the second row. Similarly, the product management device 54 can detect that a tag signal received by the tag signal antenna 1$c$ is a tag signal received from an RFID tag 3 of a product arranged on the third row, that a tag signal received by the tag signal antenna 1$d$ is a tag signal received from an RFID tag 3 of a product arranged on the fourth row, that a tag signal received by the tag signal antenna 1$e$ is a tag signal received from an RFID tag 3 of a product arranged on the fifth row, and that a tag signal received by the tag signal antenna 1$f$ is a tag signal received from an RFID tag 3 of a product arranged on the sixth row.

Figure 3:
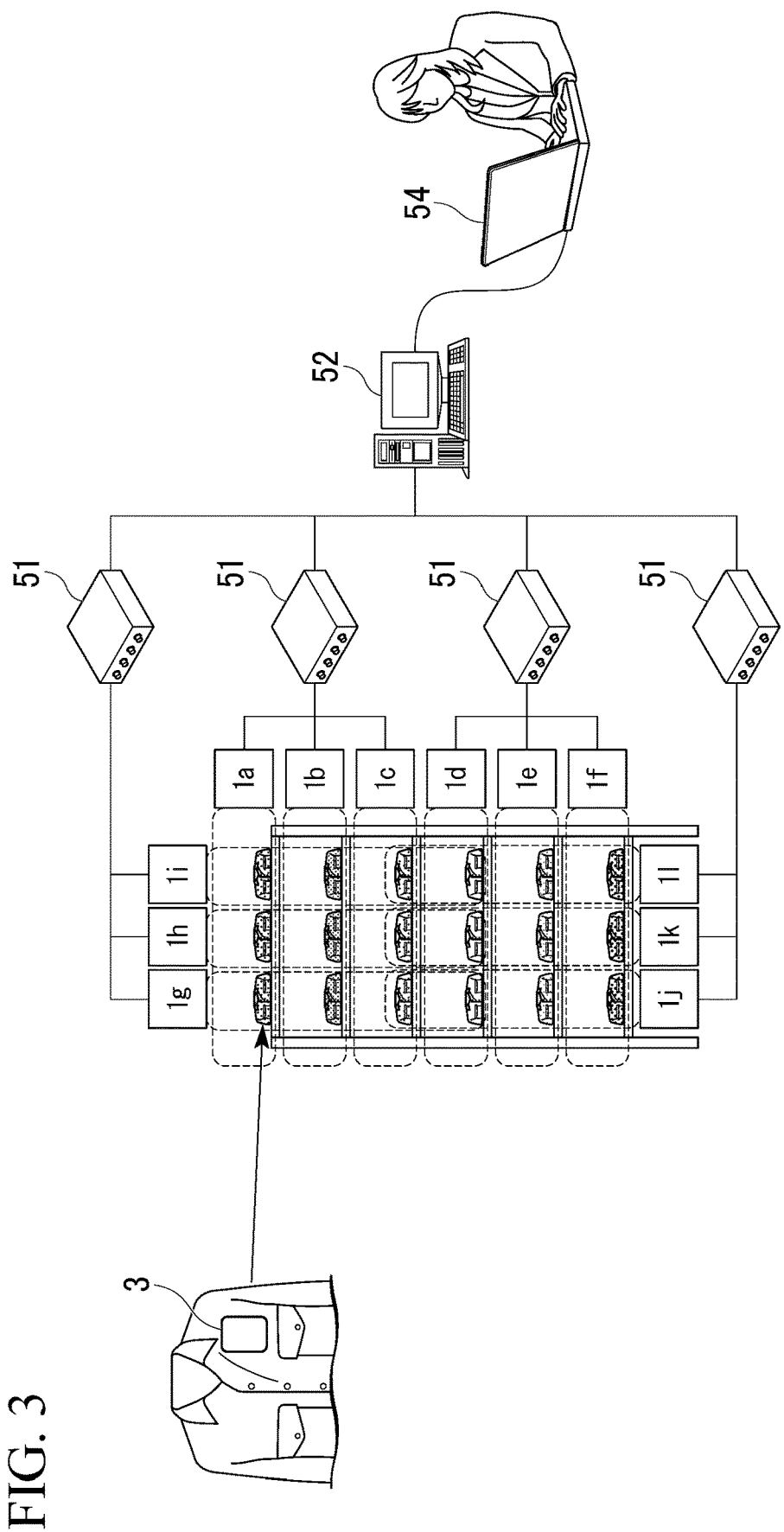
FIG. 3 is a second diagram illustrating a specific example of a wireless tag system according to an embodiment of the present invention.

FIG. 3 is a second diagram illustrating a specific example of a wireless tag system according to the same embodiment.

Tag signal antennas 1 may be arranged separately for product units in the horizontal direction and the vertical direction of the product shelves, as illustrated in FIG. 3. Specifically, the tag system 100 in FIG. 3 has tag signal antennas 1 that receive tag signals of RFID tags 3 of products from the horizontal direction on each shelf on the product shelves, and these are referred to as the tag signal antennas 1$a$, 1$b$, . . . , 1$f$ in the order from the uppermost tag signal antenna 1 towards the lower shelves.

Additionally, the wireless tag system 100 in FIG. 3 has tag signal antennas 1 that transmit trigger signals downward from above vertical columns of the shelves in the product shelves and that receive tag signals from the RFID tags 3 of the products. These tag signal antennas 1 will be referred to as the tag signal antennas 1$g$, 1$h$ and 1$i$ in the order from the tag signal antenna 1 in the leftmost column towards the right.

Additionally, the wireless tag system 100 in FIG. 3 has tag signal antennas 1 that transmit trigger signals upward from below the vertical columns of the shelves in the product shelves and that receive tag signals from the RFID tags 3 of the products. These tag signal antennas 1 will be referred to as the tag signal antennas 1$j$, 1$k$ and 1$l$ in the order from the tag signal antenna 1 in the leftmost column towards the right.

The shelves will be referred to as the first row, the second row, . . . from the uppermost shelf downward, and the columns will be referred to as the first column, the second column, . . . from the column on the left side of the shelves. In this case, the product management device 54 can detect that a tag signal received by the tag signal antenna 1*a* and the tag signal antenna 1*g* (and/or the tag signal 1*j*) is a tag signal received from the RFID tag 3 of a product arranged in the first column on the first row. The same applies to products arranged in other rows and columns.

Figure 4:
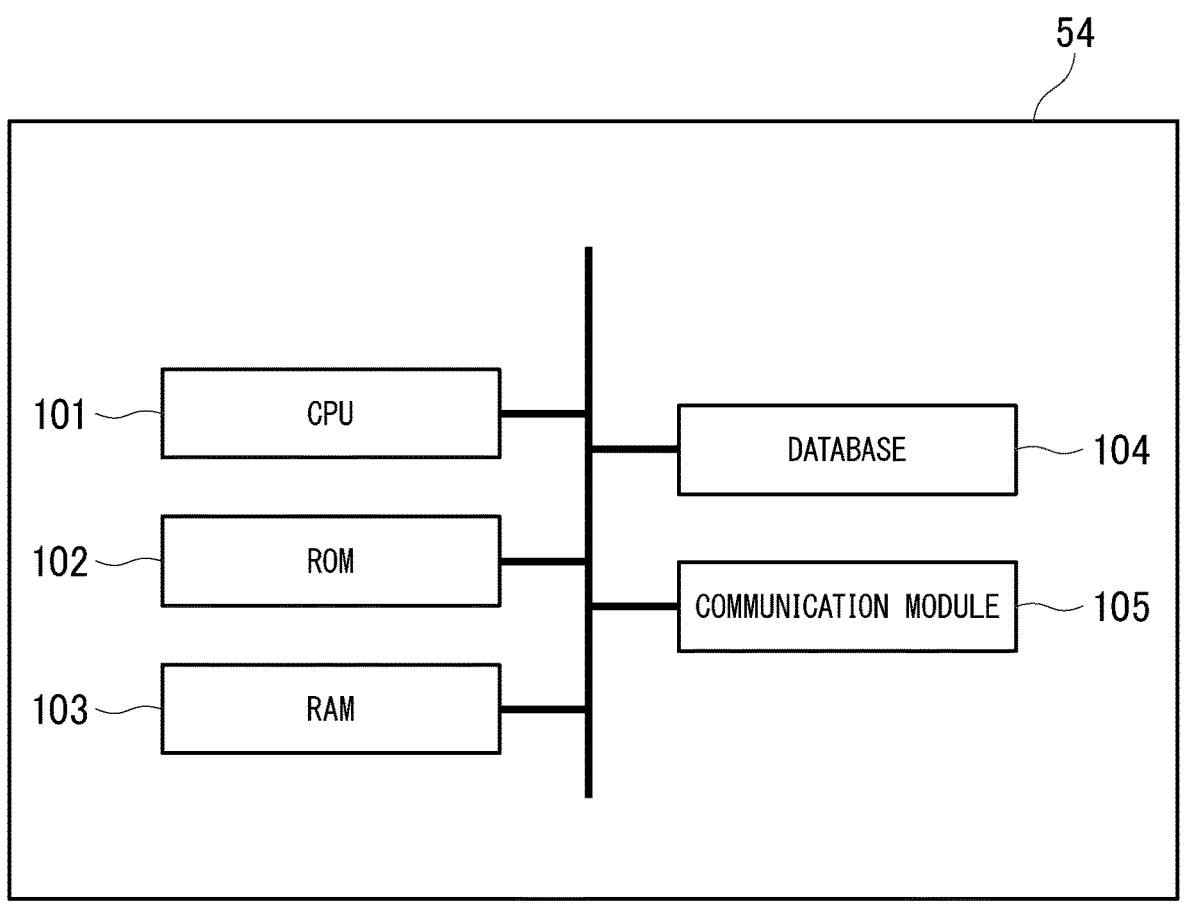
FIG. 4 is a hardware configuration diagram of a product management device according to an embodiment of the present invention.

FIG. 4 is a hardware configuration diagram of a product management device.

The product management device 54 illustrated in this drawing is a computer provided with hardware such as a CPU (Central Processing Unit) 101, a ROM (Read-Only Memory) 102, a RAM (Random Access Memory) 103, a database 104 and a communication module 105.

Figure 5:
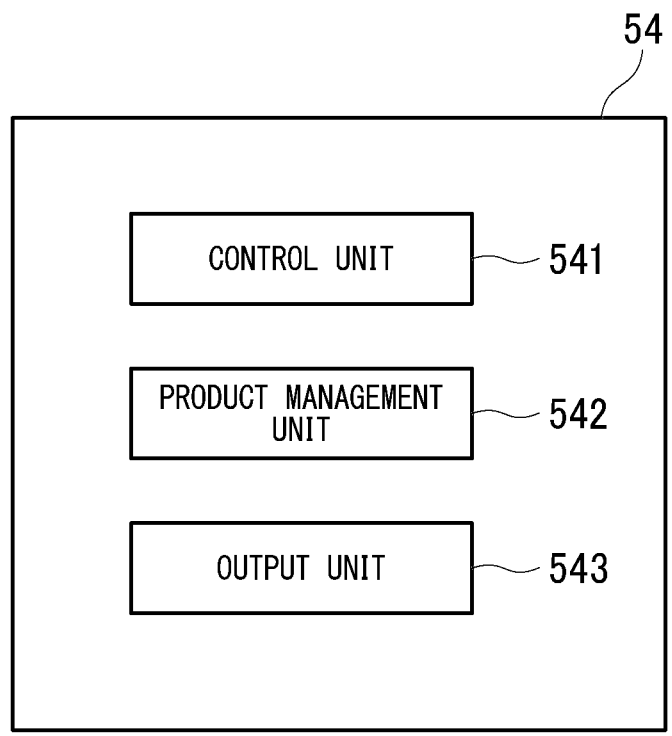
FIG. 5 is a functional block diagram of a product management device according to an embodiment of the present invention.

FIG. 5 is a functional block diagram of a product management device.

The product management device 54 starts when a power supply is turned on and executes a pre-stored product management program. As a result thereof, the product management device 54 is provided with the functions of a control unit 541, a product management unit 542 and an output unit 543.

The control unit 541 controls the functional units in the product management device 54.

The product management unit 542 performs a product management process.

The output unit 543 outputs the results of the management process.

Figure 6:
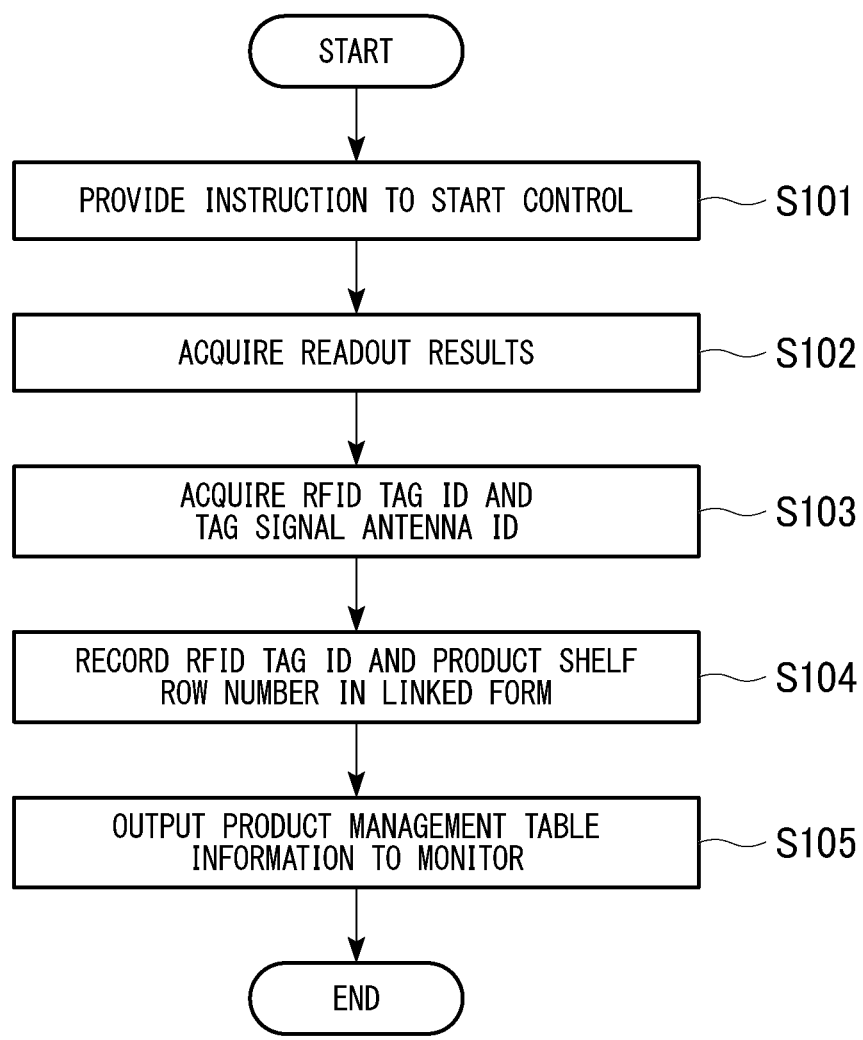
FIG. 6 is a first diagram indicating the processing flow in a product management device according to an embodiment of the present invention.

FIG. 6 is a first diagram indicating the processing flow in the product management device.

Next, the processing flow in the product management device 54 will be explained in order by using the example of the arrangement of the tag signal antennas 1 in FIG. 2.

The product management device 54 instructs the control terminal 52 to start control (step S101). The control terminal 52, upon receiving the instruction to start control from the control unit 541 in the product management device 54, outputs startup signals to the reader/writer device 51 and the transmission device 53. The reader/writer device 51 and the transmission device 53 start up. The control terminal 52 detects an information readout timing stored in the RFID tag 3. The control terminal 52 may, for example, detect the timing on the basis of a user operation, or may automatically detect a prescribed timing.

The control terminal 52 notifies the reader/writer device 51 of a first transmission output value Ptx1, which is a transmission output for the trigger signal in the tag signal antenna 1. The first transmission output value Ptx1 may be pre-stored in the reader/writer device 51 or the tag signal antenna 1. Additionally, the control terminal 52 may notify the transmission device 53 of a second transmission output value Ptx2, which is a transmission output for the reception area shaping signal in the area shaping antenna 2. The second transmission output value Ptx2 may also be pre-stored in the transmission device 53 or the area shaping antenna 2.

The reader/writer device 51 outputs electric power corresponding to the first transmission output value Ptx1 to the tag signal antenna 1 and controls the transmission of the trigger signal from the tag signal antenna 1. The transmission device 53 outputs electric power corresponding to the second transmission output value Ptx2 to the area shaping antenna 2 and controls the transmission of the reception area shaping signal from the area shaping antenna 2. The transmission device 53 may control the area shaping antenna 2, based on control by the control terminal 52, so that the reception area shaping signal is always transmitted.

As a result thereof, signal exchange areas between the tag signal antennas 1 and the RFID tags 3 based on the trigger signals are formed as in the shaping areas 12. Tag signals transmitted by RFID tags 3 located inside the shaping areas 12 are received by the tag signal antennas 1. Each tag signal antenna 1 outputs, to the reader/writer device 51, reception information including the tag signal and the ID of that antenna. The reader/writer device 51 outputs, to the control terminal 52, readout results including the ID of the RFID tag 3 and the ID of the tag signal antenna, included in the received information. The control terminal 52 outputs the readout results to the product management device 54.

The product management unit 542 in the product management device 54 acquires the readout results via the communication module 105 in that device (step S102). The product management unit 542 acquires the ID of the RFID tag 3 and the ID of the tag signal antenna 1 in the readout results (step S103). The product management unit 542 pre-stores, in a storage unit such as the database 104, the correspondence between the IDs of the tag signal antennas 1 and the row numbers of the product shelves. The product management unit 542 acquires the row number of the product shelf linked to the ID of the tag signal antenna 1.

The product management unit 542 links the ID of the RFID tag 3 with the row number of the product shelf and records them in a product management table in the database 104 (step S104). The IDs of the RFID tags 3 may be identification information for identifying the products. As a result thereof, the product management device 54 can record, in the product management table, which products are arrayed on which rows among the shelves in the product shelves.

After a prescribed time period has elapsed from step S101, the output unit 543 outputs the product management table information to a monitor or the like (step S105). As a result thereof, a manager is able to confirm which products are arrayed on which rows among the shelves in the product shelves.

Figure 7:
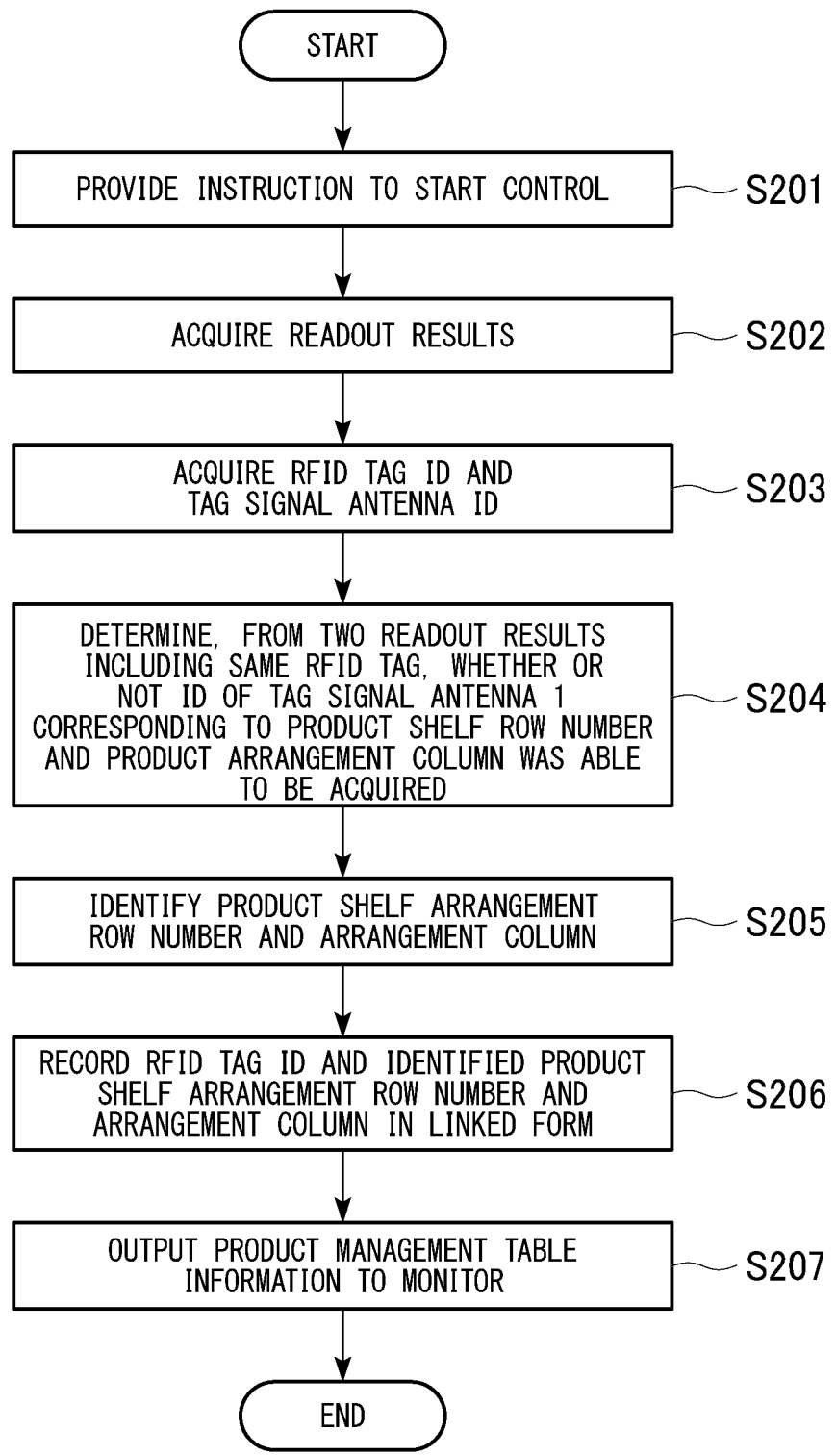
FIG. 7 is a second diagram indicating the processing flow in a product management device according to an embodiment of the present invention.

FIG. 7 is a second diagram indicating the processing flow in the product management device.

When a tag signal antenna 1 corresponding to each row and each column of the product shelves is provided, as in FIG. 3, the product management device 54 identifies the location of a product in the manner indicated below.

Specifically, the product management device 54 instructs the control terminal 52 to start control (step S201). The product management unit 542 acquires the readout results via the communication module 105 in that device (step S202). The product management unit 542 acquires the ID of the RFID tag 3 and the ID of the tag signal antenna 1 in the readout results (step S203). The product management unit 542 determines whether or not the ID of a tag signal antenna 1 corresponding to the row number of a product shelf and to a column in which products are arranged was able to be acquired based on two readout results including the ID of the same RFID tag 3 (step S204).

When a tag signal antenna ID corresponding to the row number of a product shelf and to a column in which products are arranged has been acquired in readout results including the ID of the same RFID tag 3, the product shelf arrangement row number and the arrangement column are identified based on the IDs of the tag signal antennas 1 included in the multiple readout results (step S205). The product management unit 542 links the ID of the RFID tag 3 with the product shelf arrangement row number and the arrangement column, and records them in the product management table in the database 104 (step S206). The ID of the RFID tag 3 is identification information for identifying a product. After a prescribed time period has elapsed from step S101, the output unit 543 outputs the product management table information to a monitor or the like (step S207).

As a result thereof, the product management device 54 is able to record, in the product management table, which products are arrayed on which row numbers among the shelves in the product shelves. As a result thereof, in the product management device 54, if the IDs of the tag signal antennas 1 corresponding to a row number and a column in the product shelves are recorded in a product management table so as to be linked to an ID of one RFID tag 3, a manager is able to determine that a product is arranged at the arrangement location identified by the row number and the column in the product shelves.

According to the above-mentioned wireless tag system 100, it is possible to estimate the locations of products based on tag signals received by the tag signal antennas, and to manage the number and locations of desired products.

Figure 8:
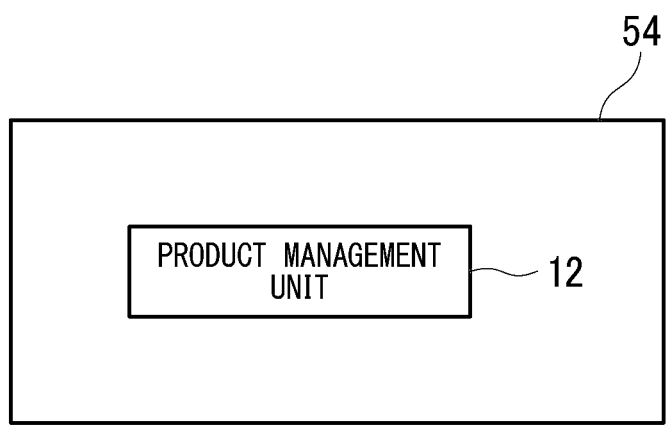
FIG. 8 is a diagram illustrating the minimum configuration for a product management device according to an embodiment of the present invention.

FIG. 8 is a diagram illustrating the minimum configuration for the product management device.

The product management device 54 may be provided with at least the above-mentioned product management unit 542 (FIG. 5).

The reader/writer device 51, the control terminal 52, the transmission device 53 and the product management device 54 described above may be computers provided with hardware such as a CPU, a ROM, a RAM, an HDD and a communication module.

The reader/writer device 51, the control terminal 52, the transmission device 53 and the product management device 54 described above include computer systems. Furthermore, the processing steps described above are stored, in the form of a program, on a computer-readable recording medium, and the above-mentioned processes are performed by a computer reading out and executing this program. In this case, the computer-readable recording medium refers to a magnetic disk, a magneto-optic disk, a CD-ROM, a DVD-ROM, a semiconductor memory or the like. Additionally, this computer program may be distributed to a computer by means of a communication line, and the computer that has received this distributed program may be execute the program.

Additionally, the above-mentioned program may be for realizing just some of the aforementioned functions.

Furthermore, the program may be in the form of a so-called difference file (difference program) that can realize the aforementioned functions in combination with a program that is already stored on a computer system.

Priority is claimed on Japanese Patent Application No. 2018-010968, filed Jan. 25, 2018, the entire disclosure of which is incorporated herein by reference.

INDUSTRIAL APPLICABILITY

According to the present invention, the location of a product can be estimated based on a tag signal received by a tag signal antenna, and the number and locations of desired products can be managed.

REFERENCE SIGNS LIST

1 Tag signal antenna
2 Area shaping antenna
3 RFID tag
51 Reader/writer device
52 Control terminal
53 Transmission device
54 Product management device
541 Control unit
542 Product management unit
543 Output unit

What is claimed is:

1. A wireless tag system comprising:
    a tag signal antenna configured to receive a tag signal transmitted from a wireless transmission tag; and
    a communication area shaping antenna configured to transmit a reception area shaping signal for narrowing an area in which the tag signal antenna can communicate with the wireless transmission tag,
    wherein the tag signal antenna and the communication area shaping antenna are arranged for each prescribed product unit in a group of products that are arranged.

2. The wireless tag system according to claim 1, wherein the communication area shaping antenna is disposed on a side opposite to the wireless transmission tag with respect to the tag signal antenna, and transmits the reception area shaping signal in a direction including the axial direction of the beam of a trigger signal that triggers transmission of the tag signal from the wireless transmission tag.

3. The wireless tag system according to claim 1, further comprising:
    a product management device, wherein
    the product management device identifies an arrangement location of the product based on an identifier of the tag signal antenna that received the tag signal identifying the product.

4. The wireless tag system according to claim 1, wherein the group of products are respectively arrayed on a plurality of the product shelves for each prescribed product unit; and
    a plurality of the tag signal antennas and a plurality of the communication area shaping antennas are arranged so as to correspond to the plurality of the product shelves.

5. The wireless tag system according to claim 1, wherein the tag signal antenna transmits a trigger signal that triggers transmission of the tag signal from the wireless transmission tag, and
    the communication area shaping antenna transmits the reception area shaping signal as a noise signal of the trigger signal, and limits the area.

6. The wireless tag system according to claim 5, wherein the reception area shaping signal is signal that reduce at least one of the reception sensitivity of the trigger signal in the wireless transmission tag and the reception sensitivity of the tag signal in the tag signal antenna.

7. A product management device provided in a wireless tag system in which a tag signal antenna configured to receive a tag signal transmitted by a wireless transmission tag, and a communication area shaping antenna that transmits a reception area shaping signal for narrowing an area in which the tag signal antenna can communicate with the wireless transmission tag are arranged for each prescribed product unit in a group of products that are arranged, wherein:
    the product management device identifies an arrangement location of the product based on an identifier of the tag signal antenna that received the tag signal identifying the product.

8. A product management method including:
    arranging, for each prescribed product unit in a group of products that are arranged, a tag signal antenna configured to receive a tag signal transmitted by a wireless transmission tag, and a communication area shaping antenna configured to transmit a reception area shaping signal for narrowing an area in which the tag signal antenna can communicate with the wireless transmission tag.

\* \* \* \* \*